Feb. 15, 1966     H. GOLDE     3,235,248
DRIVE DEVICE AND A METHOD OF PRODUCING THE SAME
Filed March 23, 1962     5 Sheets-Sheet 1

Inventor:
HANS GOLDE
By: NOLTE AND NOLTE
ATTORNEYS

Feb. 15, 1966           H. GOLDE           3,235,248
DRIVE DEVICE AND A METHOD OF PRODUCING THE SAME
Filed March 23, 1962           5 Sheets-Sheet 2
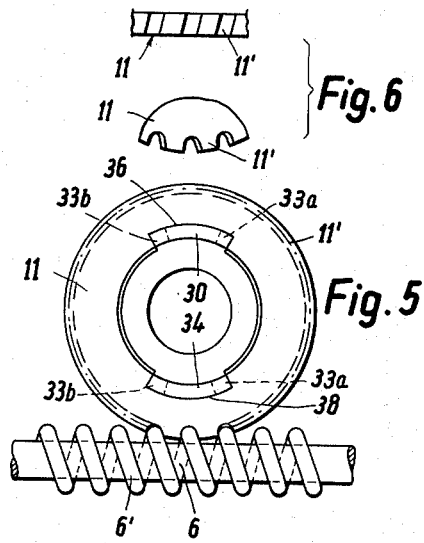
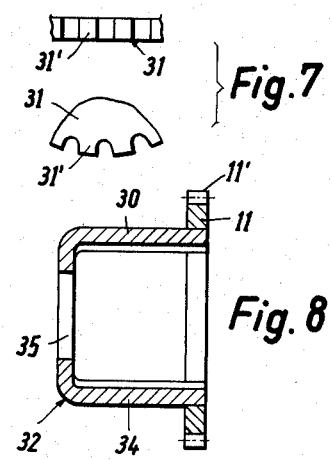
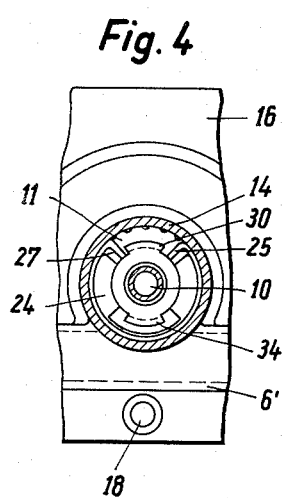
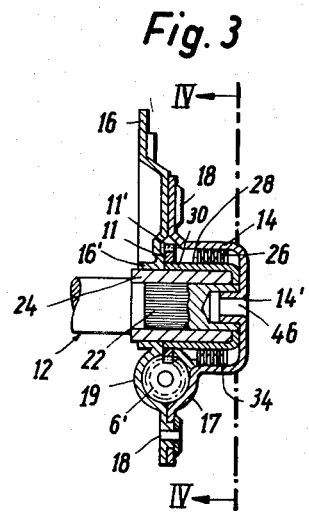
Inventor:
HANS GOLDE
BY: NOLTE AND NOLTE
ATTORNEYS Feb. 15, 1966 H. GOLDE 3,235,248
DRIVE DEVICE AND A METHOD OF PRODUCING THE SAME
Filed March 23, 1962 5 Sheets-Sheet 3

Inventor:
HANS GOLDE
BY: NOLTE AND NOLTE
ATTORNEYS

Feb. 15, 1966     H. GOLDE     3,235,248
DRIVE DEVICE AND A METHOD OF PRODUCING THE SAME
Filed March 23, 1962     5 Sheets-Sheet 4

Inventor:
HANS GOLDE
By: NOLTE AND NOLTE
ATTORNEYS

Feb. 15, 1966 H. GOLDE 3,235,248
DRIVE DEVICE AND A METHOD OF PRODUCING THE SAME
Filed March 23, 1962 5 Sheets-Sheet 5

Inventor:
HANS GOLDE
BY: NOLTE AND NOLTE
ATTORNEYS

United States Patent Office 3,235,248
Patented Feb. 15, 1966

3,235,248
DRIVE DEVICE AND A METHOD OF
PRODUCING THE SAME
Hans Golde, 338 Hanauer Landstrasse,
Frankfurt am Main, Germany
Filed Mar. 23, 1962, Ser. No. 182,071
Claims priority, application Germany, Apr. 1, 1961,
G 23,708; Aug. 26, 1961, G 24,497; Nov. 14, 1961,
G 24,911
7 Claims. (Cl. 268—122)

The invention relates to a drive device, more particularly for the operation of a sliding window in a motor vehicle.

According to one aspect of the present invention, there is provided a drive device, comprising a driving shaft, peripheral portions of said shaft defining a recess therein, a toothed annular element punched from sheet metal and substantially co-axial with said shaft, a driving element extending in an axial direction of said shaft and in said recess and fast with said annular element for driving said annular element when driven by said shaft, a coil spring encircling said shaft for frictionally engaging a braking surface with its outer periphery, end portions at both ends of said coil spring bent over inwardly, and shoulder portions at the periphery of said shaft for abutting said end portions.

According to another aspect of the present invention, there is provided a method of producing a drive device, comprising forming a recess and shoulder portions at the periphery of a driving shaft, punching a toothed annular element from sheet metal, providing a driving element fast with said annular element and extending into said recess in an axial direction of said shaft, said annular element being co-axial with said shaft, and mounting a coil spring on said shaft such that said spring encircles said shaft and that inwardly bent-over portions at both ends of said spring are disposed for abutment by said shoulder portions.

Figure 1:
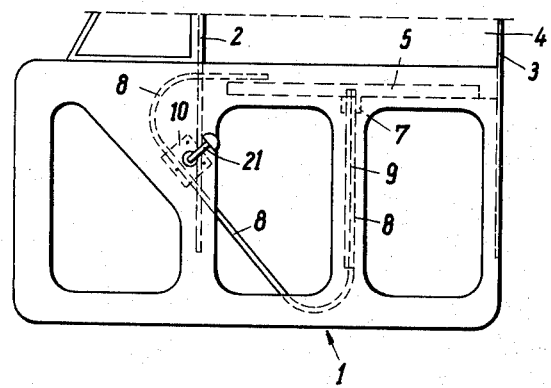
Figure 2:
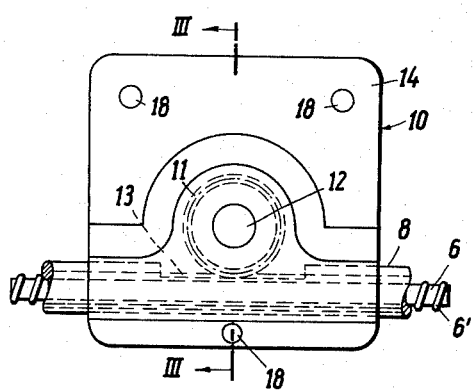
Figure 9:
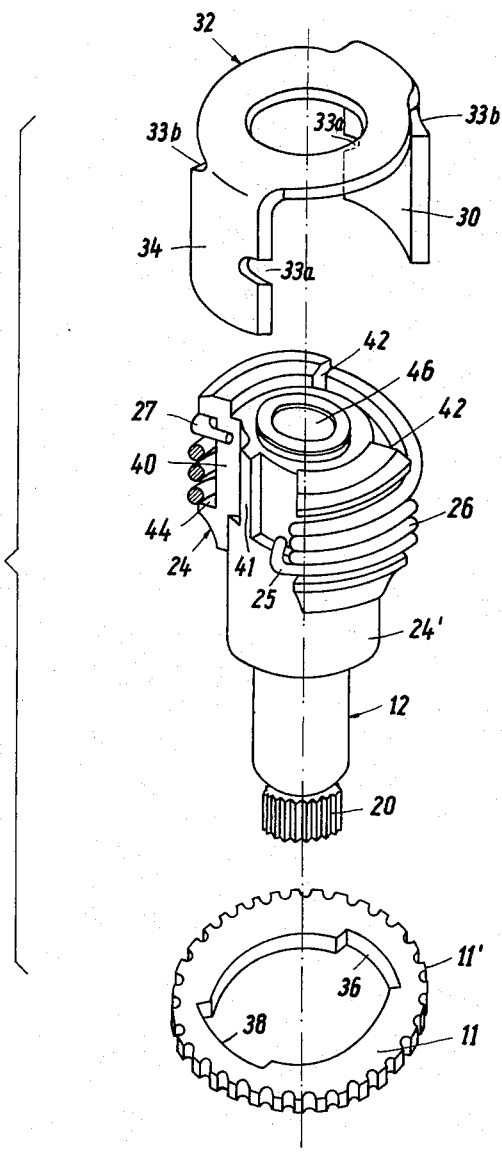
Figures 10, 11:
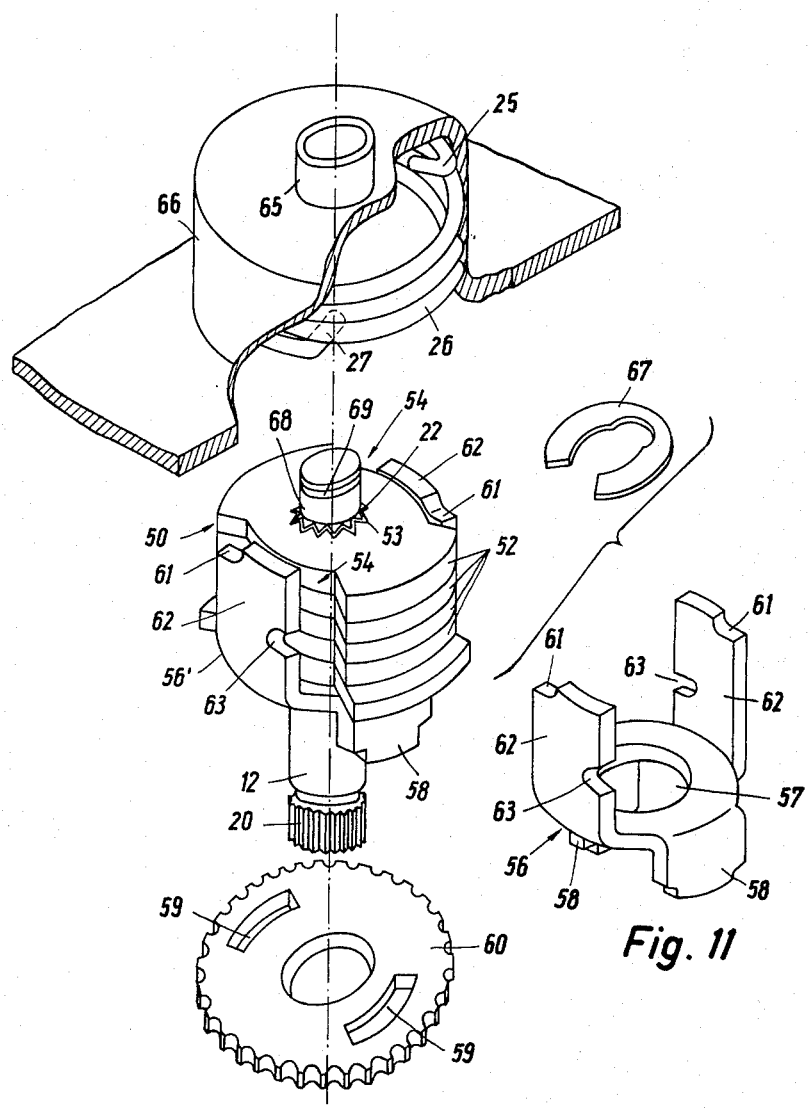
Figure 12:
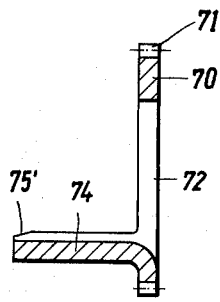
Figure 13:
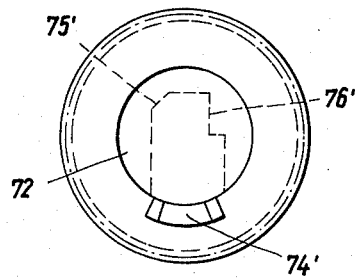

In order that the invention may be clearly understood and readily carried into effect, reference will now be made, by way of example, to the accompanying drawings, in which:

FIGURE 1 is a partial side view of a motor vehicle door having a sliding window and a drive device for the window, FIGURE 2 is a view of a detail of FIGURE 1, but with a part removed, FIGURE 3 is a sectional view taken on the line III—III of FIGURE 2, FIGURE 4 is a sectional view taken on the line IV—IV of FIGURE 3, FIGURE 5 is a detail of FIGURE 4 with parts removed, FIGURE 6 shows fragmentary side and front views of a toothed annular element seen in FIGURE 5, FIGURE 7 shows fragmentary side and front views of a modified version of the annular element seen in FIGURE 5, FIGURE 8 is an axial sectional view through the toothed annular element and a driving element seen in FIGURE 5, FIGURE 9 is an exploded perspective view of the drive device, FIGURE 10 is an exploded perspective view corresponding to FIGURE 9 of a modified version of the drive device, FIGURE 11 is a perspective view of a driving element seen in FIGURE 10, FIGURE 12 is an axial sectional view corresponding to FIGURE 8 of a modified version of the toothed annular element and the driving element, and FIGURE 13 is an end view of the elements shown in FIGURE 12.

Referring to FIGURE 1, an inner metal sheeting 1 of the motor vehicle door is provided with vertical guides 2 and 3 for a sliding window 4. A lower edge 5 of the sliding window is connected fast, by a connecting element 7 and an arm (not seen), to one end of a flexible cable 6 which is so guided in a tubular guide 8 as to be able to transmit force axially. The guide 8 has a vertical portion in which is provided a longitudinal slot 9 through which extends the arm connecting the cable 6 and the element 7. The tubular guide 8 and the cable 6 extend through a housing 10 within which a toothed annular element 11 (see FIGURE 2) is arranged to be driven by a driving shaft 12. Element 11 forms a rotary driven element which surrounds and is freely turnable with respect to the elongated rotary drive shaft 12. The teeth of the element 11 engage with a helical rib 6' which is rigidly arranged on the cable 6. Within the housing 10, the guide 8 is provided with an opening 13 permitting engagement of the toothed wheel 11 with the cable 6.

As shown more particularly in FIGURES 3, 4 and 5, the housing 10 is composed of an outer, cupped part 14 and a relatively flat, inner part 16. The two parts are releasably connected by screws, or non-releasably by hollow rivets 18, in external flanges of the parts. As will be apparent from FIGURE 3, curved portions 17 and 19 of the two housing parts 14 and 16 form, in the vicinity of the toothed wheel 11, a bearing for the tubular guide 8.

The shaft 12 includes a steel shank which is formed at both ends with serrations 20 and 22. The serrations 20 are used for mounting a hand crank 21 (see FIGURE 1). However, if desired, an automatic drive consisting for example of an electric motor, could instead be connected to this end of the shank. Fitted on the serrations 22 is a head part 24 of the shaft 12, which head part is a casting.

Surrounding the shaft head 24 is a per se known coil-type braking spring 26 which has radially inwardly bent-over end portions 25 and 27 at both ends of the spring, those portions extending into one of two recesses 28 which extend in an axial direction of the shaft 12 and which are formed at diametrically opposite locations on the periphery of the shaft head part 24. Thus, the shaft head part 24 forms a portion of the elongated rotary drive shaft 12 which is formed with a pair of diametrically opposed axially extending grooves 28, the shaft portion 24 having for each groove a pair of longitudinally extending shoulders which define the opposite sides of each groove. The spring bears with frictional contact on an internal cylindrical surface of the cupped part 14 when in the relaxed state. It thus prevents accidental rotation of the shaft 12, but when the shaft 12 is rotated, one of the shoulders bounding the recess 28 engages one spring end and loads the spring, i.e. reduces its diameter. The toothed element 11 has an external toothing 11' and is fast with a driving element 32 which consists of a base part and two parallel limbs 30 and 34 which extend away from the base part in one axial direction of the shaft 12 and which project into the respective recesses 28 in the shaft head part 24. Thus, when the shaft head part 24 rotates, the driving element 32 turns the toothed element 11.

The toothed element 11 is punched from sheet metal and has external teeth of spur form also produced by punching. After the punching operation, the spur-form teeth are given a helical form by rolling the element 11 on a master wheel provided with milled helical teeth, thus providing the punched element 11 with helical toothing 11' as shown in FIGURE 6. However, it is possible to omit the rolling step so that a toothed element 31 has spur-form teeth 31' as shown in FIGURE 7. But the helical toothing 11' is particularly suitable for engagement with helical rib 6' of the cable 6.

The driving element 32 (see FIGURE 8) is punched from sheet metal and initially consists of a base part having a central hole 35 and having limbs which extend from the base part in opposite directions. Then the limbs are bent through a right angle to form the limbs 30 and 34. The driving element 32 is connected to the toothed element 11 by insertion of the two limbs 30 and 34 into diametrically opposite notches 36 and 38 in the inner periphery of the annular element 11, the limbs locking resiliently into the notches. The limbs are of an arcuate cross-section and the notches 36 and 38 are segment-shaped for receiving the limbs. There are also provided on the limbs 30 and 34 small lateral recesses 33a and 33b (see particularly FIGURES 5 and 9) adjacent to the end portions 25 and 27 of the braking spring and receiving those end portions.

FIGURE 9 shows the way in which the parts of the drive device are assembled. The central part of the figure shows the shank of the shaft 12 with the head part 24 fitted on to the serrations 22 (not seen). The head part 24 is a casting and has a tapered extension 24'. The part 24 is formed at its periphery with two recesses 40 and 42 and a shallow annular recess 44 coaxial with the shaft for accommodating the braking spring 26. If required, small central webs 41 can be left in the middle of the recesses 40 and 42 in order to support the limbs 30 and 34, the recesses being deepest at the sides of the web 41 for receiving the spring end portions 25 and 27. The limbs 30 and 34 of the element 32 are introduced into the recesses 40 and 42 such that the spring 26 is situated outside the limbs. That end of the shaft 12 having the serrations 22 extends into the hole 35. The toothed element 11 is passed over the serrations 20 and fitted on the free ends of the limbs 30 and 34 in such a manner that the free limb ends are made fast resiliently in the notches 36 and 38 without any further fixing by welding or the like being required. When the shaft 12 rotates, the U-shaped driving element 32 is also rotated since its limbs are held in the recesses 40 and 42. The limbs 30 and 34 of the frame shown in FIG. 8 have a width substantially less than that of the grooves or recesses 40 and 42 along which these limbs extend, and of course these limbs form a pair of motion transmitting elements fixed to the driven element 11 and transmitting to the latter the rotary motion of the drive shaft 12.

With the pair of driving limbs 30 and 34 and the pair of recesses 40 and 42 in a symmetrical arrangement, the advantage is obtained that the assembly of the parts of the device is facilitated to a considerable extent, since, owing to the symmetry, it is immaterial which recess receives the ends of the braking spring, and moreover the annular element, the driving element and the shaft automatically take up the correct position relatively to one another when they are fitted together.

After the assembly of the drive device of FIGURE 9, the device is then inserted into the bore of the inner housing part 16, the bore being defined by a bearing collar 16'. The cupped outer housing part 14 which is formed with a central bore defined by an inwardly directed bearing collar 14', is then mounted in position with the bearing collar 14' inserted in an end bore 46 of the shaft 12. Thereafter, the two housing parts are connected together releasably by screws or permanently by the rivets 18. Finally, the hand crank 21 is mounted on the serrations 20 in such a manner as to be fast against relative rotation, and is then secured in an appropriate manner in position on the shaft.

If desired, the inner housing part 16 can be formed by deformation of the inner door sheeting 1, i.e. it can be an integral part of the metal sheeting of the door.

With regard to FIGURE 10, a shaft head part 50 is assembled from a plurality of individual discs 52 punched from sheet metal and each having a serrated central bore 53 into which fit the serrations 22 of the shaft (see also FIGURE 3). Each disc has at diametrically opposite locations at the outer periphery thereof recess portions provided therein. The discs 52 have their radial faces in contact and are so oriented that they form diametrically opposite recesses 54 at the outer periphery of the shaft head 50 for receiving the spring ends 25 and 27 and limbs 62 of a driving element 56.

The driving element 56 (see also FIGURE 11) is punched from sheet metal as a criciform piece having a central bore 57. Two of the limbs of the piece are bent through a right angle to form two limbs 58 which extend in the same axial direction away from the centrally-holed base part 56' of element 56 (see FIG. 10) and extend into elongated apertures 59 in a toothed annular element 60. The apertures are formed at locations between the inner and outer peripheries of the element 60 and correspond in shape to that of the cross-section of the free limb ends. The two other limbs are bent through a right angle to form the limbs 62 which extend away from the base part in the opposite axial direction and into the recess 54. The limbs 62 are punched with recesses 61 and 63 for receiving the bent-over spring end portions. Here also, two of these four recesses 61 and 63 are provided in each limb 62 at locations corresponding to the end portions of the spring, in order to provide a symmetrical arrangement.

When this version is assembled, the driving element 56 is passed over the serrations 20 and brought up to the part 50. A cupped outer housing part 66 has an outwardly directed collar 65 through which projects on end 68 of the driving shaft 12 which end projects beyond the head part 50. This end 68 is formed with an annular groove 69 in which is inserted a spring clip 67 in order to prevent axial movement of the assembled device. The cupped housing part 66 is connected to the second housing part 16 in a manner similar to that shown in FIGURE 3.

Regarding FIGURES 12 and 13, a toothed annular element 70 is punched from sheet metal simultaneously and integrally with its external teeth 71 and with a tongue 74' projecting into a central bore 72 of the element 70. The form of the tongue is substantially rectangular with a bevelling 75' at one free corner and a recess 76' at the other free corner. The tongue punched in this way is shown in chain lines in FIGURE 13. The tongue 74' is then bent over through 90° out of the plane of the toothed element 70 and thus forms a driving element 74 which is intended to engage in a recess on the periphery of a driving shaft in order thus to establish a connection between the toothed element 70 and the driving shaft. The bevelled portion 75' and the recess 76' provide room for play of the braking spring end portions.

The two-part construction of the driving shaft has the advantage that depending on the drive device, the same shank can be combined with any one of various head parts, for example with a head part having one recess for the driving element shown in FIGURE 12 or with a head part having two recesses for the driving element shown in FIGURE 9 or 11. A further advantage of the two-part shaft resides in the fact that the head part which is a casting, and the shank, which generally consists of a steel pin, can together be produced more cheaply separately than if the head part and the shank were to be integral.

I claim:
1. A drive device comprising an elongated rotary drive shaft having a portion formed with an axially extending groove, said drive shaft having at said portion thereof a pair of longitudinally extending shoulders defining opposite sides of said groove, respectively, a stationary tubular housing part coaxially surrounding and spaced from said portion of said drive shaft, a brake spring coiled about said portion of said drive shaft in the interior of said housing part and having a rest position where the convolutions of said spring press against an inner surface of said housing part, said spring having a pair of free ends extending into said groove and respectively located adjacent said sides thereof so that depending upon the direction of rotation of said shaft one or the other of the shoulders thereof will displace an end of said spring to release the latter from said inner surface of said housing part, a rotary driven element surrounding and freely turnable with respect to said shaft adjacent said portion thereof, and an elongated motion-transmitting element fixed to said driven element and extending therefrom axially along said shaft into said groove thereof, said motion-transmitting element having a width less than that of said groove so that first a shoulder of said portion of said shaft will displace an end of said spring to release the latter from said housing part and then said latter shoulder will engage said motion-transmitting element to transmit rotary movement of said shaft through said motion-transmitting element to said driven element.

2. A drive device as recited in claim 1 and wherein said portion of said shaft is formed with a second axial groove diametrically opposed to and coextensive with said first-mentioned groove, and a second elongated motion-transmitting element diametrically opposed to and identical with said first-mentioned motion-transmitting element, said second motion-transmitting element also being fixed to said driven element and extending therefrom into said second axial groove, so that when a drive is transmitted from said shaft to said driven element the drive will be transmitted through both of said motion-transmitting elements in a balanced manner to said driven element.

3. A drive device as recited in claim 1 and wherein said portion of said shaft is separate from the remainder thereof and is in the form of an enlarged head releasably connected with the remainder of said shaft.

4. A drive device as recited in claim 1 and wherein said shaft is formed at said portion thereof with a second groove identical with and diametrically opposed to said first-mentioned groove, a second motion-transmitting element identical with said first-mentioned motion-transmitting element also fixed to said driven element and extending therefrom into said second groove, said second motion-transmitting element being diametrically opposed to said first-mentioned motion-transmitting element, a base part situated at an end of said shaft and fixed to said pair of motion-transmitting elements to form together with the latter and said driven element a substantially rectangular frame, said driven element being in the form of a gear having teeth which are inclined with respect to the axis of said shaft, an elongated cable having a helical rib at its periphery engaged by said teeth of said driven element, and a guide guiding said cable for longitudinal movement, so that during rotation of said driven element said cable will be advanced along said guide.

5. A drive device as recited in claim 4 and wherein a sliding member is connected to said cable to be displaced during longitudinal movement of the latter, and guides cooperating with said sliding member to guide the latter for sliding movement in response to longitudinal movement of said cable.

6. A device as recited in claim 5 and wherein said sliding member is a window of a vehicle.

7. A drive device as recited in claim 1 and wherein said portion of said shaft is formed with a second axial groove diametrically opposed to and coextensive with said first-mentioned groove, and a second elongated motion-transmitting element diametrically opposed to and identical with said first-mentioned motion-transmitting element, said second motion-transmitting element also being fixed to said driven element and extending therefrom into said second axial groove, so that when a drive is transmitted from said shaft to said driven element the drive will be transmitted through both of said motion-transmitting elements in a balanced manner to said driven element, said first-mentioned and second motion-transmitting elements being integral with and extending in the same direction from an annular member to which a pair of limbs are fixed extending in a direction from said annular member opposite to that in which said motion-transmitting elements extend and said limbs being fixed with said driven element.

References Cited by the Examiner

UNITED STATES PATENTS

| 1,965,878 | 7/1934 | Briggs | 192—8 |
| 2,145,666 | 1/1939 | Roethel | 192—8 |
| 2,881,881 | 4/1959 | Sacchini et al. | 192—8 |
| 2,919,911 | 1/1960 | Furtah | 268—133 |
| 2,973,991 | 3/1961 | Werner | 268—133 |
| 3,135,369 | 6/1964 | Nisenson et al. | 192—8 |

FOREIGN PATENTS

| 639,721 | 7/1950 | Great Britain. |

HARRISON R. MOSELEY, *Primary Examiner.*